UNITED STATES PATENT OFFICE.

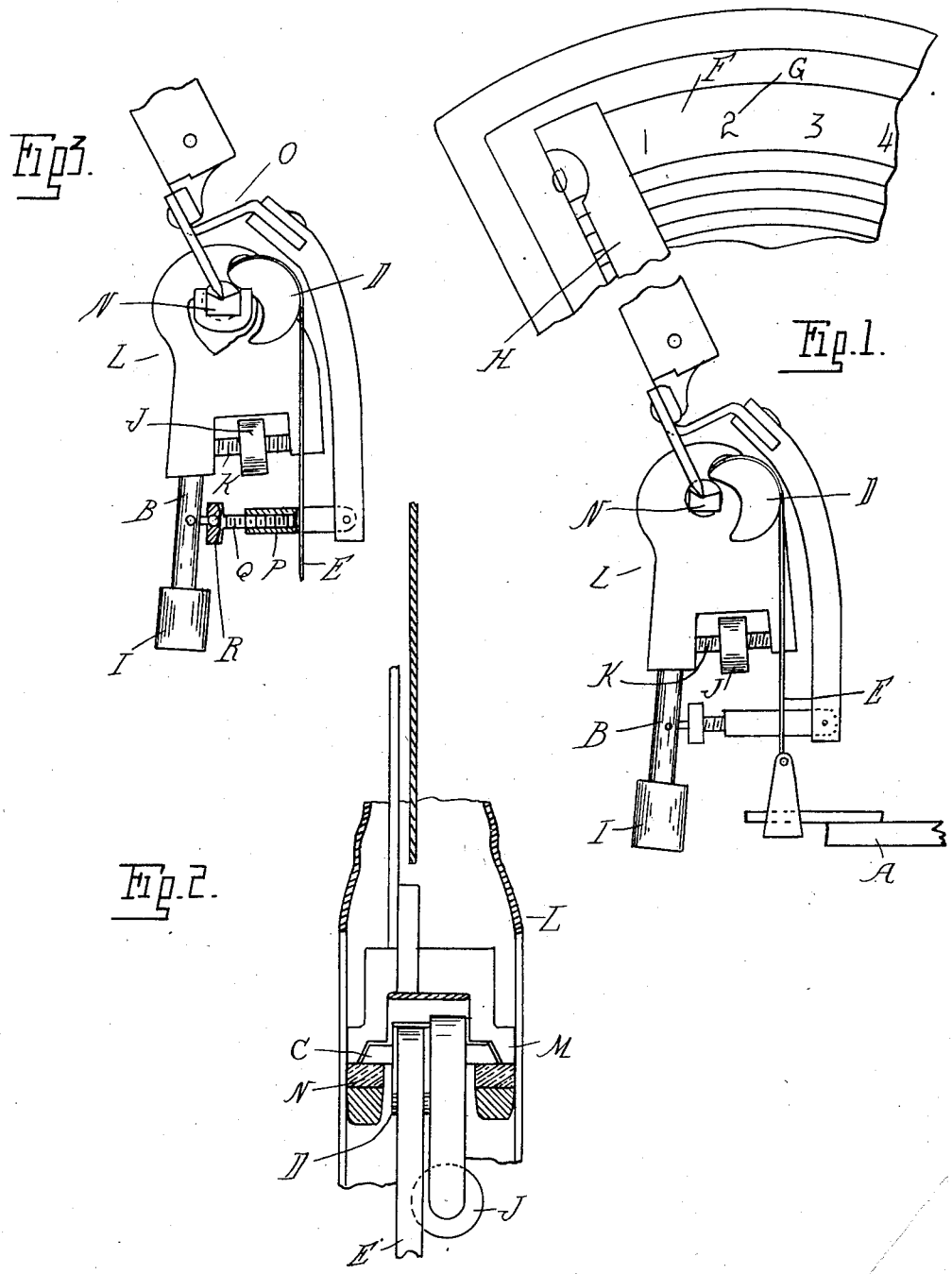

WALTER F. STIMPSON, OF DETROIT, MICHIGAN, ASSIGNOR TO GEORGE W. HURD, OF DUNDEE, MICHIGAN.

ADJUSTABLE INDEX FOR SCALES.

1,092,872.  Specification of Letters Patent.  Patented Apr. 14, 1914.

Application filed January 30, 1911. Serial No. 605,376.

*To all whom it may concern:*

Be it known that I, WALTER F. STIMPSON, a citizen of the United States of America, residing at Detroit, in the county of Wayne and State of Michigan, have invented certain new and useful Improvements in Adjustable Indexes for Scales, of which the following is a specification, reference being had therein to the accompanying drawings.

The invention relates to scales of that type commonly known as automatic, and in which the weighing is effected by the variable deflection of a pendulum weight and the coöperation of an index.

The invention consists in the peculiar construction of parts and particularly in the adjustable connection of the index which facilitates and simplifies the operation of sealing the scale.

In the drawings,—Figure 1 is a front elevation of the pendulum weight and index of a scale constructed in accordance with my invention; Fig. 2 is a cross section thereof; Fig. 3 is a view similar to Fig. 1 partly in section.

With scales of the type above referred to and particularly with computing scales, it is customary to provide an indicator such as the fan-shaped computing chart on which the computations are placed, the graduation of the chart being uniform. This necessitates a compensating mechanism to produce uniform angular movement of the pendulum weight with equal increments of weight on the scale platform, and in the construction to which my improvements are applied, the desired result is accomplished by a flexible band operating upon an eccentric pulley on the pendulum arm. It is however, necessary to provide adjustments for properly sealing the mechanism. and as heretofore constructed, this operation is attended with considerable difficulty. With the present construction, the operation is simplified by rendering the index hand adjustable independently of the adjustment of the pendulum weight, the construction being as follows:

A is the scale lever extending from the platform (not shown), B is the pendulum weight which is supported upon knife edge pivots C and is provided with the eccentric pulley D for engaging the flexible band E leading to and connected with the lever A.

F is the weighing and computing chart of the usual fan-shaped form and which is provided with uniform graduations as indicated at G.

H is the index hand arranged to swing in a path adjacent to the chart and actuated by the pendulum weight B.

To facilitate the sealing of the mechanism, the pendulum weight B is provided with a ball I longitudinally adjustable on the pendulum arm, and there is also provided a laterally adjustable weight J engaging a threaded stem K and by which the balance may be altered. This permits of adjustment which would change the normal position of the pendulum and by means of which a uniform angular movement is produced by equal increments in weight actuating the lever A so as to correspond with the graduations on the chart. There is however, another feature to be considered and that is the actual position of the index hand when the scale mechanism is in balance, which position must correspond with the zero marking on the chart. To obtain this merely by an adjustment of the ball I and weight J is a difficult operation, but by making the index independently angularly adjustable, the operation is greatly simplified. Thus as shown, the index H is independent of the pendulum weight B and is provided at its base with a bifurcated supporting member L having knife edge bearings M embracing the knife edge pivots C and in alinement therewith. These bearings M engage the same supporting bearing-blocks N as are employed for supporting the pivots C, and therefore, the axis of movement of the index arm exactly coincides with that of the pendulum weight. For actuating the index, the arm O attached thereto is extended around the pivots and is connected at its lower end by an adjustable link P with the lower end of the pendulum weight B. This link as shown is formed by a member having a threaded socket which is engaged by a threaded stem Q having an operating thumb wheel R, the arrangement being such that by adjusting this wheel the link is lengthened or shortened, thereby producing an angular movement of the index with respect to the pendulum weight.

With the construction as described, in sealing the scale the operator may first adjust the weights J and I to produce the proper action in the pendulum weight without any reference to the position of the index on the chart, by then adjusting the wheel R the index may be moved to stand normally at zero and this is effected without disturbing the adjustment of the pendulum weight.

What I claim as my invention is:

1. In a scale, the combination of a scale lever, a pendulum weight, a support upon which the pendulum weight is pivoted, a compensating mechanism between said pendulum weight and said lever for producing uniform angular movement with equal increments of weight, an index arm adjustable about a point in axial alinement with the pivot of the pendulum weight, and means for adjusting said index arm about said point whereby said index arm is adjustable angularly with respect to said pendulum weight while maintaining said uniform angular movement.

2. In a scale, the combination of a weighing lever, a pendulum weight, a compensating mechanism between said lever and pendulum weight for producing uniform angular movement of the pendulum with equal increments of weight, an indicator, an index arm, a knife edge pivot for supporting said pendulum weight, an independent axially alined knife edge pivot for supporting said index arm, an extension of said index arm below the fulcrum, and an adjustable connection between said extension and said pendulum weight.

3. In a scale, the combination with a pendulum weight, of a knife edge pivot supporting said weight, an index arm, a bifurcated member supporting said index arm embracing said pendulum pivot and having knife edge bearings axially alined therewith, an extension of said index around said knife edge pivot, and an adjustable connection between said extension and said pendulum weight.

4. In a scale, the combination with a pendulum weight, of a knife edge pivot for supporting said weight, a bifurcated supporting bearing for said knife edge pivot, an index arm, a bifurcated member supporting said index arm embracing said pendulum pivot and having knife edge bearings axially alined therewith, said bearings being also in engagement with the bifurcated supporting bearing for the pendulum, and an adjustable connection between said index and pendulum weight.

5. In a scale, the combination with a weighing lever, a pendulum weight, a compensating connection between said weighing lever and pendulum weight for producing uniform angular movement of the pendulum with equal increments of weight, a laterally adjustable weight mounted on said pendulum weight, an index arm independent of said pendulum weight and axially alined therewith, an arm extending from said index to the opposite side of the fulcrum, and an adjustable link between said arm and pendulum weight.

6. In a scale, the combination with a pendulum weight, of an index arm, and means for adjusting said index arm angularly with respect to the pendulum weight comprising an adjustable link between said arm and weight.

7. In a scale, the combination with a pendulum weight, of an index arm adjustable relative thereto, an arm extending from the index to the opposite side of the fulcrum thereof, and an adjustable link between the pendulum and said arm for varying the angular relation of the latter to the pendulum.

8. In a scale, the combination of a weighing lever, an index arm, a support upon which said index arm is mounted, a pendulum weight depending from said support, the latter being provided with a recess, a threaded stem arranged in said recessed portion, a laterally adjustable weight engaging said threaded stem, and a compensating mechanism between said lever and said pendulum weight for producing uniform angular movement of the pendulum with equal increments of weight.

In testimony whereof I affix my signature in presence of two witnesses.

WALTER F. STIMPSON.

Witnesses:
  JAMES P. BARRY,
  WILLIAM E. PAGEL.

---

Copies of this patent may be obtained for five cents each, by addressing the "Commissioner of Patents, Washington, D. C."